(12) United States Patent
Tu et al.

(10) Patent No.: US 10,922,785 B2
(45) Date of Patent: Feb. 16, 2021

(54) PROCESSOR AND METHOD FOR SCALING IMAGE

(71) Applicant: BEIJING BAIDU NETCOM SCIENCE AND TECHNOLOGY CO., LTD., Beijing (CN)

(72) Inventors: Yichen Tu, Beijing (CN); Jian Ouyang, Beijing (CN); Wei Qi, Beijing (CN); Yong Wang, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 83 days.

(21) Appl. No.: 16/265,566

(22) Filed: Feb. 1, 2019

(65) Prior Publication Data
US 2019/0164254 A1 May 30, 2019

Related U.S. Application Data

(63) Continuation of application No. PCT/CN2016/097293, filed on Aug. 30, 2016.

(30) Foreign Application Priority Data

Aug. 1, 2016 (CN) .......................... 2016 1 0621655

(51) Int. Cl.
G06T 3/40 (2006.01)
G06T 1/20 (2006.01)
G06T 1/60 (2006.01)

(52) U.S. Cl.
CPC .................. G06T 3/40 (2013.01); G06T 1/20 (2013.01); G06T 1/60 (2013.01)

(58) Field of Classification Search
CPC .... G06F 16/9577; G06F 16/50; G06F 16/583; G06T 3/403; G06T 9/005; G06T 19/003;
(Continued)

(56) References Cited

U.S. PATENT DOCUMENTS 5,113,494 A * 5/1992 Menendez ............. G06K 15/00
345/501
5,410,644 A * 4/1995 Thier .................... G06T 3/005
345/501
(Continued)

FOREIGN PATENT DOCUMENTS

CN 1670766 A 9/2005
CN 101183521 A 5/2008
(Continued)

OTHER PUBLICATIONS

International Search Report dated Apr. 27, 2017 for International Application No. PCT/CN2016/097293, 6 pages.
(Continued)

*Primary Examiner* — Santiago Garcia
(74) *Attorney, Agent, or Firm* — Knobbe, Martens, Olson & Bear LLP

(57) ABSTRACT

A processor and method for scaling an image are disclosed. A specific embodiment of the processor includes: an off-chip memory, a communication circuit, a control circuit, and an array processor, wherein: the off-chip memory is configured for storing a to-be-scaled original image; the communication circuit is configured for receiving an image scaling instruction; the control circuit is configured for executing the image scaling instruction, and sending a calculation control signal to the array processor; and the array processor is configured for calculating in parallel channel values of N channels in a target pixel using N processing elements in the array processor under the control of the calculation control signal based on a width scaling factor, a height scaling factor, and channel values of N channels in extracted pixel data. The embodiment has improved the processing speed of an image scaling operation.

18 Claims, 5 Drawing Sheets

(58) Field of Classification Search
CPC . G06T 7/13; G06T 3/40; G06K 9/325; G06K 9/00288; G06K 9/00577; G06K 9/4671; G06K 9/4647; G06K 9/4652; G06K 9/00624; G06K 9/6202; G06K 9/00221; G06K 9/32; H04N 1/2133; H04N 2201/3225; H04N 5/23219; H04N 5/23222; H04N 2101/00; H04N 2201/3222; H04W 4/025; H01L 23/576; B23K 26/042; G09G 2320/048; G09G 2340/0421
USPC ........ 382/298, 299, 300, 303; 345/501, 502, 345/423
See application file for complete search history.

(56) References Cited

U.S. PATENT DOCUMENTS

| | | | | |
|---|---|---|---|---|
| 5,592,574 | A * | 1/1997 | Chilton | G06K 9/00463 382/295 |
| 7,151,861 | B2 | 12/2006 | Chan | |
| 7,227,519 | B1 * | 6/2007 | Kawase | G09G 3/2081 345/77 |
| 7,788,579 | B2 * | 8/2010 | Berkner | G06F 40/106 715/243 |
| 9,342,894 | B1 * | 5/2016 | Gopalakrishnan | H04N 1/393 |
| 9,432,616 | B1 * | 8/2016 | Hurd | G06T 3/4053 |
| 2004/0130546 | A1 * | 7/2004 | Porikli | G06K 9/342 345/423 |
| 2009/0184891 | A1 * | 7/2009 | Neuman | H04N 7/0122 345/55 |
| 2009/0324079 | A1 * | 12/2009 | Yuan | G06K 9/325 382/176 |
| 2010/0046842 | A1 * | 2/2010 | Conwell | G06K 9/32 382/218 |
| 2010/0328321 | A1 * | 12/2010 | Cormack | G06T 15/00 345/501 |
| 2012/0027290 | A1 * | 2/2012 | Baheti | G06K 9/4671 382/154 |
| 2012/0287139 | A1 * | 11/2012 | Wyatt | G09G 5/39 345/520 |
| 2013/0007603 | A1 * | 1/2013 | Dougherty | G06F 40/114 715/251 |
| 2013/0047162 | A1 * | 2/2013 | Stefanov | G06F 9/5033 718/102 |
| 2013/0322753 | A1 * | 12/2013 | Lim | G06T 5/50 382/167 |
| 2014/0355896 | A1 * | 12/2014 | Osada | G06K 9/346 382/229 |
| 2015/0296193 | A1 * | 10/2015 | Cote | G06T 3/4015 382/167 |
| 2015/0347859 | A1 * | 12/2015 | Dixon | G06K 9/186 382/138 |
| 2016/0342888 | A1 * | 11/2016 | Yang | G06K 9/00986 |
| 2017/0076169 | A1 * | 3/2017 | Campbell | G06T 3/0093 |

FOREIGN PATENT DOCUMENTS

| | | |
|---|---|---|
| CN | 101950523 A | 1/2011 |
| CN | 102890816 A | 1/2013 |
| CN | 103369338 A | 10/2013 |
| CN | 104361555 A | 2/2015 |

OTHER PUBLICATIONS

Written Opinion of the International Searching Authority dated Apr. 27, 2017 for International Application No. PCT/CN2016/097293, 3 pages.

* cited by examiner

PROCESSOR AND METHOD FOR SCALING IMAGE

CROSS-REFERENCE TO RELATED APPLICATIONS

This is a continuation of International Application PCT/CN2016/097293, with an international filing date of Aug. 30, 2016, which claims priority to Chinese Patent Application no. 201610621655.X, filed in China on Aug. 1, 2016, the contents of which are incorporated herein by reference in their entirety.

TECHNICAL FIELD

The present disclosure relates to the field of computer technology, specifically to the field of image processing technology, and more specifically to a processor and method for scaling an image.

BACKGROUND

When the existing technical solutions execute a scaling operation on an image using a general-purpose processor, information such as the original image size, the target image size, the width scaling factor, and the height scaling factor, needs to be first obtained, and the scaling operation can then be performed based on the information.

However, technical defects still exist in the process of executing the image scaling in the existing technologies. First, the image scaling process fails to fully mine the parallelism, resulting in low efficiency. Although the single instruction multi-data flow operation provided by some general-purpose processors enables same operations to be executed in parallel, the parallelism is usually low. Furthermore, parameters need to be repeatedly calculated in the image scaling process, which is time consuming. Therefore, it is necessary to improve the existing technologies, to overcome the defects.

SUMMARY

An object of this disclosure is to provide an improved processor and method for scaling an image, to solve the technical problems mentioned in the background part.

In a first aspect, this disclosure provides a processor for scaling an image. The processor includes an off-chip memory, a communication circuit, a control circuit, and an array processor. The off-chip memory is configured for storing a to-be-scaled original image, the original image is an N-channel image, and N is an integer greater than 1; the communication circuit is configured for receiving an image scaling instruction, the image scaling instruction includes a width scaling factor and a height scaling factor; the control circuit is configured for executing the image scaling instruction, and sending a calculation control signal for calculating pixel data of each target pixel in a scaled target image to the array processor; and the array processor is configured for extracting pixel data of a pixel in the original image corresponding to a target pixel under the control of the calculation control signal, and calculating in parallel channel values of N channels in the target pixel using N processing elements in the array processor based on the width scaling factor, the height scaling factor, and channel values of N channels in the extracted pixel data.

In some embodiments, the processor further includes an on-chip cache; and the control circuit includes: a read control unit configured for orderly reading the pixel data of the original image in the off-chip memory into the on-chip cache; and a calculation control unit configured for sending to the array processor a calculation control signal of extracting the pixel data of the pixel in the original image corresponding to the target pixel from the on-chip cache.

In some embodiments, the on-chip cache includes a first on-chip cache and a second on-chip cache, and a read-write speed of the second on-chip cache is greater than a read-write speed of the first on-chip cache; and the read control unit is further configured for: reading the pixel data in the original image successively row by row into the first on-chip cache; and reading the pixel data in each row in the first on-chip cache successively column by column into the second on-chip cache; and the calculation control unit is further configured for: sending to the array processor the calculation control signal of extracting the pixel data of the pixel in the original image corresponding to the target pixel from the second on-chip cache.

In some embodiments, the calculation control unit is further configured for: sending the calculation control signal to the array processor when the read control unit completes reading the pixel data of the pixel in the original image corresponding to the target pixel into the second on-chip cache.

In some embodiments, the processor further includes: a parameter transfer circuit configured for acquiring values of parameters $x_0$, $w_0$, $w_1$, $y_0$, $h_0$, and $h_1$ using coordinates (x,y) of the target pixel in the target image, the width scaling factor scale_w, and the height scaling factor scale_h, and transferring the values to the array processor, where $x_0 = \lfloor x/\text{scale\_w} \rfloor$, $y_0 = \lfloor y/\text{scale\_h} \rfloor$, $h_0 = y/\text{scale\_h} - y_0$, $h_1 = y_0 - y/\text{scale\_h} + 1$, $w_0 = x/\text{scale\_w} - x_0$, and $w_1 = x_0 - x/\text{scale\_w} + 1$; and the array processor further configured for: defining four adjacent pixels corresponding to coordinates $(x_0, y_0)$, $(x_0+1, y_0)$, $(x_0, y_0+1)$, and $(x_0+1, y_0+1)$ in the original image as the pixels corresponding to the target pixel, and extracting the pixel data; and calculating in parallel the channel values Y(x,y) of the N channels in the target pixel using the N processing elements in the array processor based on an equation $Y(x,y) = X(x_0,y_0) \times w_0 \times h_0 + X(x_0+1,y_0) \times w_1 \times h_0 + X(x_0,y_0+1) \times w_0 \times h_1 + X(x_0+1,y_0+1) \times w_1 \times h_1$. The $X(x_0,y_0)$, $X(x_0+1,y_0)$, $X(x_0,y_0+1)$, and $X(x_0+1,y_0+1)$ are channel values of current channels in the four adjacent pixels respectively.

In some embodiments, the parameter transfer circuit is further configured for: determining a corresponding data table in a data table set pre-stored in the processor based on the width scaling factor scale_w and the height scaling factor scale_h; and querying current values of x and y in the determined data table to obtain corresponding values of the parameters $x_0$, $w_0$, $w_1$, $y_0$, $h_0$, and $h_1$. The data table set includes data tables corresponding to different values of the width scaling factor and the height scaling factor, and different values of x and y under a current width scaling factor and a current height scaling factor, and values of $x_0$, $w_0$, $w_1$, $y_0$, $h_0$, and $h_1$ corresponding thereto are stored in the data tables in association.

In some embodiments, the N processing elements in the array processor share a multiplier set, and the array processor is further configured for: calculating $w_0 \times h_0$, $w_1 \times h_0$, $w_0 \times h_1$, and $w_1 \times h_1$ using the multiplier set shared between the plurality of processing elements.

In some embodiments, the processor further includes a cache management device configured for at least one of following items: releasing pixel data having an abscissa less than $x_0$ in rows in the first on-chip cache; or releasing pixel data having an abscissa equal to $x_0$ and an ordinate less than $y_0$ in columns in the second on-chip cache.

In some embodiments, the read operation control circuit is further configured for: determining rows to be read into the first on-chip cache in the pixel data of the original image based on abscissas of pixels in the original image corresponding to target pixels in the target image; reading the determined to-be-read rows row by row into the first on-chip cache; and/or determining columns to be read into the second on-chip cache in the rows of the pixel data in the first on-chip cache based on ordinates of the pixels in the original image corresponding to target pixels in the target image; and reading the determined to-be-read columns column by column into the second on-chip cache.

In a second aspect, the disclosure provides a method for scaling an image. The method includes: receiving an image scaling instruction, the image scaling instruction including a width scaling factor and a height scaling factor, a to-be-scaled original image being an N-channel image, N being an integer greater than 1; executing the image scaling instruction, and sending a calculation control signal for calculating pixel data of each target pixel in a scaled target image to an array processor; and controlling the array processor to extract pixel data of a pixel in the original image corresponding to a target pixel using the calculation control signal, and controlling N processing elements in the array processor to calculate in parallel channel values of N channels in the target pixel based on the width scaling factor, the height scaling factor, and channel values of N channels in the extracted pixel data.

In some embodiments, the method further includes: reading the pixel data in the original image orderly into an on-chip cache; and the sending a calculation control signal for calculating pixel data of each target pixel in a scaled target image to an array processor including: sending to the array processor a calculation control signal of extracting the pixel data of the pixel in the original image corresponding to the target pixel from the on-chip cache.

In some embodiments, the on-chip cache includes a first on-chip cache and a second on-chip cache, and a read-write speed of the second on-chip cache is greater than a read-write speed of the first on-chip cache; the reading the pixel data in the original image orderly into an on-chip cache includes: reading the pixel data in the original image successively row by row into the first on-chip cache; and reading the pixel data in each row in the first on-chip cache successively column by column into the second on-chip cache; and the sending to the array processor the calculation control signal of extracting the pixel data of the pixel in the original image corresponding to the target pixel from the on-chip cache includes: sending to the array processor the calculation control signal of extracting the pixel data of the pixel in the original image corresponding to the target pixel from the second on-chip cache.

In some embodiments, the sending to the array processor a calculation control signal of extracting the pixel data of the pixel in the original image corresponding to the target pixel from the second on-chip cache includes: sending the calculation control signal to the array processor when completing reading the pixel data of the pixel in the original image corresponding to the target pixel into the second on-chip cache.

In some embodiments, the method further includes: acquiring values of parameters $x_0$, $w_0$, $w_1$, $y_0$, $h_0$, and $h_1$ using coordinates (x,y) of the target pixel in the target image, the width scaling factor scale_w, and the height scaling factor scale_h, and transferring the values to the array processor, where $x_0=\lfloor x/scale\_w \rfloor$, $y_0=\lfloor y/scale\_h \rfloor$, $h_0=y/scale\_h-y_0$, $h_1=y_0-y/scale\_h+1$, $w_0=x/scale\_w-x_0$, and $w_1=x_0-x/scale\_w+1$; and the controlling the array processor to extract pixel data of a pixel in the original image corresponding to a target pixel, and controlling N processing elements in the array processor to calculate in parallel channel values of N channels in the target pixel based on the width scaling factor, the height scaling factor, and channel values of N channels in the extracted pixel data including: controlling the array processor to define four adjacent pixels corresponding to coordinates $(x_0,y_0)$, $(x_0+1,y_0)$, $(x_0,y_0+1)$, and $(x_0+1,y_0+1)$ in the original image as the pixels corresponding to the target pixel, and extract the pixel data; and controlling the N processing elements in the array processor to calculate in parallel the channel values $Y(x,y)$ of the N channels in the target pixel based on an equation $Y(x,y)=X(x_0,y_0)\times w_0\times h_0+X(x_0+1,y_0)\times w_1\times h_0+X(x_0,y_0+1)\times w_0\times h_1+X(x_0+1,y_0+1)\times w_1\times h_1$. The $X(x_0,y_0)$, $X(x_0+1,y_0)$, $X(x_0,y_0+1)$, and $X(x_0+1,y_0+1)$ are channel values of current channels in the four adjacent pixels respectively.

In some embodiments, the acquiring values of parameters $x_0$, $w_0$, $w_1$, $y_0$, $h_0$, and $h_1$ using coordinates (x,y) of the target pixel in the target image, the width scaling factor scale_w, and the height scaling factor scale_h includes: determining a corresponding data table in a data table set pre-stored in the processor based on the width scaling factor scale_w and the height scaling factor scale_h; and querying current values of x and y in the determined data table to obtain corresponding values of the parameters $x_0$, $w_0$, $w_1$, $y_0$, $h_0$, and $h_1$. The data table set includes data tables corresponding to different values of the width scaling factor and the height scaling factor, and the different values of x and y under a current width scaling factor and a current height scaling factor, and values of $x_0$, $w_0$, $w_1$, $y_0$, $h_0$, and $h_1$ corresponding thereto are stored in the data tables in association.

In some embodiments, the N processing elements in the array processor share a multiplier set; and the controlling the N processing elements in the array processor to calculate in parallel the channel values $Y(x,y)$ of the N channels in the target pixel based on an equation $Y(x,y)=X(x_0,y_0)\times w_0\times h_0+X(x_0+1,y_0)\times w_1\times h_0+X(x_0,y_0+1)\times w_0\times h_1+X(x_0+1,y_0+1)\times w_1\times h_1$ includes: calculating $w_0\times h_0$, $w_1\times h_0$, $w_0\times h_1$, and $w_1\times h_1$ using the multiplier set shared between the plurality of processing elements.

In some embodiments, the method further includes at least one of following items: releasing pixel data having an abscissa less than $x_0$ in rows in the first on-chip cache; or releasing pixel data having an abscissa equal to $x_0$ and an ordinate less than $y_0$ in columns in the second on-chip cache.

In some embodiments, the reading the pixel data in each row in the first on-chip cache successively column by column into the second on-chip cache includes: determining rows to be read into the first on-chip cache in the pixel data of the original image based on abscissas of pixels in the original image corresponding to target pixels in the target image; and reading the determined to-be-read rows row by row into the first on-chip cache; and/or the reading the pixel data in each row in the first on-chip cache successively column by column into the second on-chip cache includes: determining columns to be read into the second on-chip cache in the rows of the pixel data in the first on-chip cache based on ordinates of the pixels in the original image corresponding to target pixels in the target image; and reading the determined to-be-read columns column by column into the second on-chip cache.

The processor and method for scaling an image provided by the present disclosure calculate in parallel channel values of channels of a pixel in a target image using processing elements in the array processor, thereby improving the parallelism of image scaling, and greatly reducing the execution speed of an image scaling operation.

BRIEF DESCRIPTION OF THE DRAWINGS

By reading and referring to detailed description on the non-limiting embodiments in the following accompanying drawings, other features, objects and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
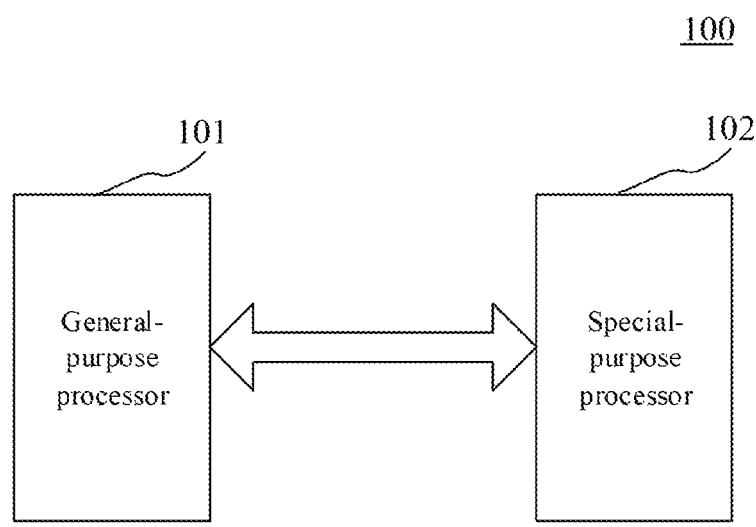
FIG. 1 is a structural diagram of an illustrative system in which some embodiments of the present disclosure may be applied.

FIG. 1 shows an illustrative system architecture 100 in which an embodiment of a processor and method for scaling an image according to the disclosure may be applied. As shown in FIG. 1, the system architecture 100 may include a general-purpose processor 101 and a special-purpose processor 102.

The general-purpose processor 101 is configured for sending an image scaling instruction and a to-be-scaled original image to the special-purpose processor 102. The special-purpose processor 102 may execute a scaling operation on the original image based on the image scaling instruction. The target image after the scaling operation may be re-sent back to the general-purpose processor 101. The general-purpose processor 102 may also be referred to as a host. The special-purpose processor 102 may be designed by a FPGA (Field-Programmable Gate Array, i.e., a field-programmable gate array server).

It should be noted that, the processor provided by the embodiment of the disclosure generally refers to the special-purpose processor 102 in FIG. 1, and accordingly, the method for executing an instruction on a processor is also generally executed by the special-purpose processor 102.

It should be understood that the number of the general-purpose processors 101 and the special-purpose processors 102 in FIG. 1 is only illustrative. There may be any number of the general-purpose processors and the special-purpose processors based on implementation needs.

Figure 2:
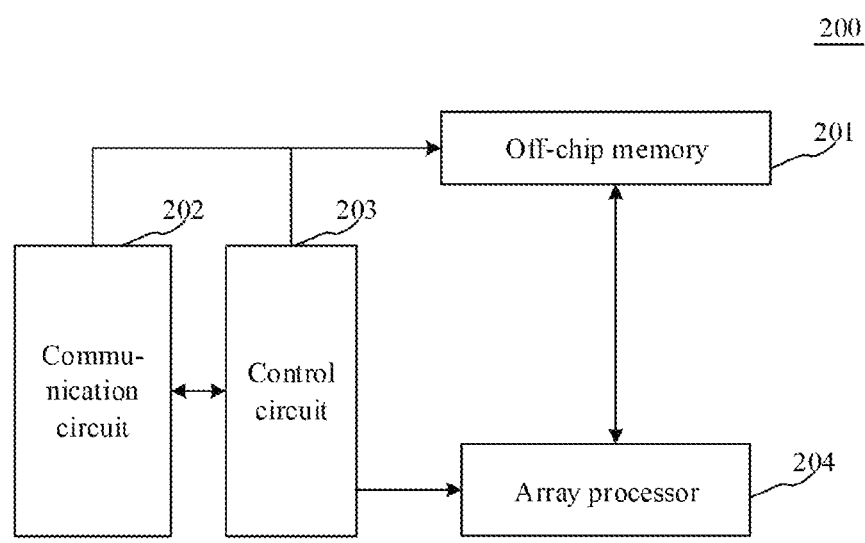
FIG. 2 is a schematic diagram of a structure of an embodiment of a processor for scaling an image according to the present disclosure.

Please further refer to FIG. 2, which shows a schematic diagram of a structure of a processor 200 according to some embodiments of the disclosure.

As shown in FIG. 2, a processor 200 includes an off-chip memory 201, an off-chip communication circuit 202, a control circuit 203, and an array processor 204.

The off-chip memory 201 may be configured for storing an original image to be subjected to a scaling operation. The original image may be an N-channel image (N is an integer greater than 1). Usually, because the scaling operation only changes an image size (i.e., height and width), but will not affect the number of channels of the image, the scaled target image is still an N-channel image. For example, when N is 32, the original image before scaling is a 32-channel image, and the scaled target image is still a 32-channel image.

The communication circuit 202 may be connected to an external host (e.g., the general purpose processor in FIG. 1), to receive image scaling instructions from the host. Usually, the image scaling instruction may include a width scaling factor and a height scaling factor. In some cases, a user may provide a size of a scaled target image. The host may first calculate the width scaling factor and the height scaling factor based on the size of the original image and the size of the target image, generate the image scaling instruction, and then send the image scaling instruction to the processor 200 in some embodiments of the present disclosure through the communication circuit. In practice, the communication circuit 202 may be connected to the host through the PCIE (Peripheral Component Interface Express), or other bus. The communication circuit 202 may be electrically connected to the control circuit 203, thereby to transfer the scaling instruction to the control circuit 203, for executing by the latter.

It should be noted that, the original image stored in the off-chip memory 201 may also be pre-acquired externally inputted image from the host through the communication circuit 202, or may also be an image that is temporarily stored in the off-chip memory 201 after last execution of the image scaling, and is to be scaled next time.

The control circuit 203 is configured for executing an image scaling instruction received from external, to generate a series of control signals, and send the control signals to the devices of the processor in a certain order, and enable the devices to execute in a desired way. The control signals include a calculation control signal for calculating pixel data of each target pixel in a scaled target image to the array processor 204. The control circuit 203 may send the calculation control signal to the array processor 204 at a specific moment, to control the array processor 204 to calculate the pixel data of the target pixel at a desired moment. It should be noted that, the control circuit 203 may also generate and issue a read/write signal for controlling a read/write operation on the memory.

The array processor 203 may execute calculating the pixel data of the target pixel under the control of the calculation control signal. First, the array processor 203 may extract the pixel data of a pixel in the original image corresponding to the target pixel. The pixel in the original image corresponding to the target pixel is associated with a specific algorithm configured for the scaling operation. That is, one or more pixels corresponding to the current target pixel may be located in the original image according to the specific algorithm configured for the scaling operation. Then the array processor 203 may calculate in parallel channel values of N channels in the target pixel using the included N processing elements based on the width scaling factor, the height scaling factor, and channel values of N channels in the extracted pixel data. Because when executing the scaling operation, the calculation of the channel values of respective channels in the target pixel may use a given equation to process the channel values of corresponding channels in the extracted pixel, i.e., the calculations on the respective channels are processes without an interdependent relationship, therefore an identical set of operations may be performed by repeatedly provided N processing elements (PE) in the array processor.

In some optional implementations of this embodiment, the processor 200 further includes an on-chip cache (not shown), while the control circuit 203 may include a read control unit (not shown) and a calculation control unit (not shown). The calculation control unit is configured for sending to the array processor 204 the calculation control signal of extracting the pixel data of the pixel in the original image corresponding to the target pixel from the on-chip cache. The calculation control unit is configured for sending to the array processor the calculation control signal of extracting the pixel data of the pixel in the original image corresponding to the target pixel. By the on-chip cache, the speed of reading the pixel data by a calculation array may be improved, thereby contributing to improving the overall processing efficiency.

Figure 3:
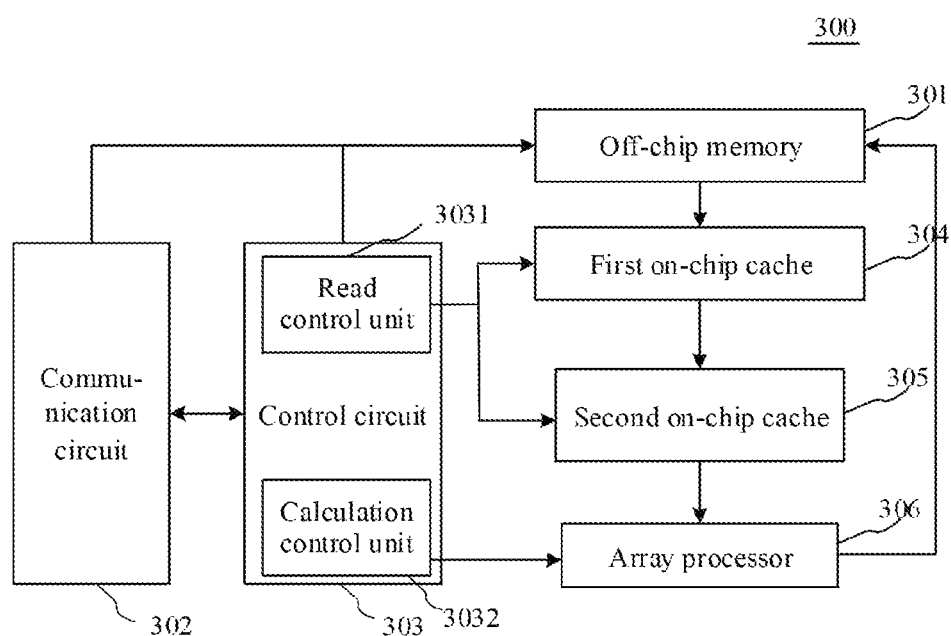
FIG. 3 is a schematic diagram of a structure of another embodiment of a processor for scaling an image according to the present disclosure.

Please further refer to FIG. 3, which shows a schematic diagram 300 of a structure of a processor according to some embodiments of this disclosure.

As shown in FIG. 3, a processor 300 includes an off-chip memory 301, a communication circuit 302, a control circuit 303, a first on-chip cache 304, a second on-chip cache 305, and an array processor 306.

Different from the embodiment in FIG. 2, the processor 300 according to this embodiment includes the first on-chip cache 304 and the second on-chip cache 305. A read-write speed of the second on-chip cache 305 is greater than a read-write speed of the first on-chip cache 304. Generally, a storage space of the second on-chip cache 305 is larger than a storage space of the first on-chip cache 304. A read control unit 3031 of the control circuit 303 is configured for reading the pixel data in the original image successively row by row into the first on-chip cache 304, and reading the pixel data in each column in the first on-chip cache 304 successively column by column into the second on-chip cache 305. The calculation control unit 3032 is further configured for: sending to the array processor the calculation control signal of extracting the pixel data of the pixel in the original image corresponding to the target pixel from the second on-chip cache 305. In this implementation, the on-chip cache is designed as a two-stage cache, the first on-chip cache is designed for reading the pixel data of the original image from the off-chip memory row by row, and the second on-chip cache is designed for reading the pixel data in each row in the first on-chip cache column by column. The pixel data in the second on-chip cache are configured for being extracted by the calculation array for calculation. Because of the designing of the two-stage cache and reading row by row and column by column, the granularity of reading data is large, repeated data reading will not be caused, which facilitates reducing the number of times of reading, thereby improving the execution speed of the image scaling operation, and reducing the operation time.

In some optional implementations of the embodiment, a calculation control unit 3032 is further configured for: sending the calculation control signal to the array processor 306 when the read control unit 3031 completes reading the pixel data of the pixel in the original image corresponding to the target pixel into the second on-chip cache 305. In this implementation, a calculation instruction is initiated when the pixel data required for the current pixel is ready in the two-stage cache, enable the operations of accessing and storing data and the operation of calculating the data by the array processor may be executed in parallel in a pipeline, and further improve the overall execution speed.

In some optional implementations of this embodiment, the processor 300 further includes: a parameter transfer circuit (not shown) configured for acquiring values of parameters $x_0$, $w_0$, $w_1$, $y_0$, $h_0$, and $h_1$ using coordinates (x,y) of the target pixel in the target image, the width scaling factor scale_w, and the height scaling factor scale_h, and transferring the values to the array processor 306, where $x_0=\lfloor x/scale\_w \rfloor$, $y_0=\lfloor y/scale\_h \rfloor$, $h_0=y/scale\_h-y_0$, $h_1=y_0-y/scale\_h+1$, $w_0=x/scale\_w-x_0$, and $w_1=x_0-x/scale\_w+1$; and the array processor further configured for: defining four adjacent pixels corresponding to coordinates $(x_0,y_0)$, $(x_0+1,y_0)$, $(x_0,y_0+1)$, and $(x_0+1,y_0+1)$ in the original image as the pixels corresponding to the target pixel, and extracting the pixel data; and calculating in parallel the channel values $Y(x,y)$ of the N channels in the target pixel using the N processing elements in the array processor based on an equation $Y(x,y)=X(x_0,y_0)\times w_0\times h_0+X(x_0+1,y_0)\times w_1\times h_0+X(x_0,y_0+1)\times w_0\times h_1+X(x_0+1,y_0+1)\times w_1\times h_1$. The $X(x_0,y_0)$, $X(x_0+1,y_0)$, $X(x_0,y_0+1)$, and $X(x_0+1,y_0+1)$ are the channel values of a current channel in the four adjacent pixels respectively. In this implementation, because pixels in the original image corresponding to the target pixel are 2×2 four adjacent pixels in the scaling operation, the read control unit 3031 may control the first on-chip cache 304 to successively read the pixel data of each two rows of pixels on the off-chip memory 301. Correspondingly, successively for the pixel data of each two rows of pixels on the first on-chip memory, the second on-chip cache 305 may successively read each two columns of pixel data, i.e., pixel data of 2×2 four adjacent pixels are acquired each time, for use in subsequent calculation. The $\lfloor \rfloor$ is a floor function, which denotes a maximum integer less than the calculated number. In this implementation, the processor 200 executes image scaling based on the equation $Y(x,y)=X(x_0,y_0)\times w_0\times h_0+X(x_0+1,y_0)\times w_1\times h_0+X(x_0,y_0+1)\times w_0\times h_1+X(x_0+1,y_0+1)\times w_1\times h_1$. In this implementation, first the processor may acquire the respective required parameters; and then the array processor determines four adjacent pixels corresponding to the parameters in the original image, and finally the channel values of the respective channels are calculated respectively using this equation by processing elements of the array processor.

In some optional implementations of this embodiment, the parameter transfer circuit is further configured for: determining a corresponding data table in a data table set pre-stored in the processor based on the scale_w and the scale_h; and querying current values of x and y in the determined data table to obtain the corresponding values of the parameters $x_0$, $w_0$, $w_1$, $y_0$, $h_0$, and $h_1$. The data table set includes data tables corresponding to different values of the width scaling factor and the height scaling factor, and the different values of x and y under a current width scaling factor and a current height scaling factor, and values of $x_0$, $w_0$, $w_1$, $y_0$, $h_0$, and $h_1$ corresponding thereto are stored in the data tables in association. The calculation on the parameters required for the scaling operation is a repeated work. In this implementation, the parameters may be pre-calculated, then configured in the data tables, and may be obtained merely by querying the data tables via the parameter transfer circuit in the processor when necessary, thereby reducing a considerable amount of repeated parameter calculation operations, and further improving the overall execution speed of the image scaling.

In some optional implementations of this embodiment, the N processing elements in the array processor 306 share a multiplier set, and the array processor 306 is further configured for: calculating $w_0 \times h_0$, $w_1 \times h_0$, $w_0 \times h_1$, and $w_1 \times h_1$ using the multiplier set shared between the N processing elements.

Figure 4:
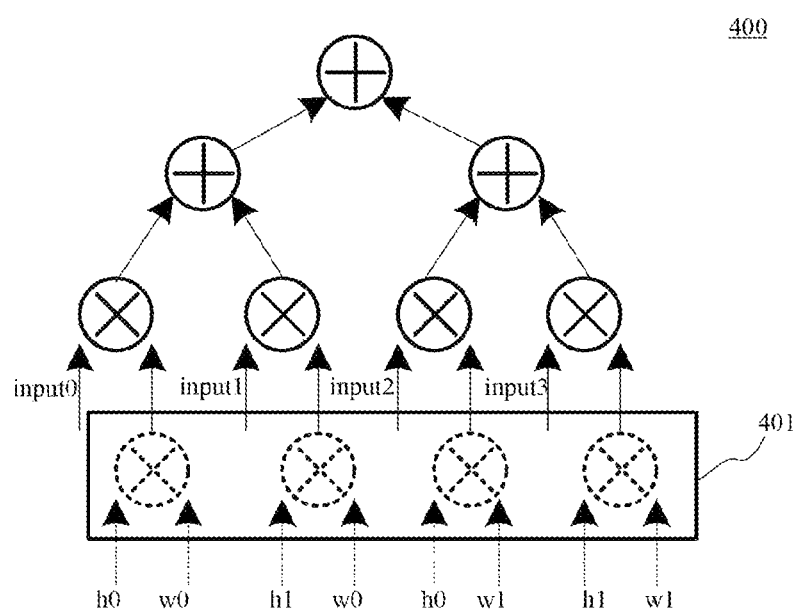
FIG. 4 is a process diagram of an embodiment of a method for scaling an image according to the present disclosure.

FIG. 4 shows a structure of a processing element 400 in a calculation array in this implementation. The processing element 400 includes a multiplier set 401 shared with other processing elements (not shown). When the calculation array is calculating in parallel channel values of N channels based on the equation, for a channel to be processed by the processing element 400, the channel values $X(x_0,y_0)$, $X(x_0+1,y_0)$, $X(x_0,y_0+1)$, and $X(x_0+1,y_0+1)$ of the channels in the four adjacent pixels may be inputted into four multipliers exclusively used by the processing element 400 through input ports, such as input0, input1, input2, and input3. Parameters, such as $h_0$, $h_1$, $w_0$, and $w_1$, are inputted into the multiplier set 401 shared between the processing element 400 and other processing elements in a way as shown in FIG. 4, to execute operations, such as $w_0 \times h_0$, $w_1 \times h_0$, $w_0 \times h_1$, and $w_1 \times h_1$, through the multiplier set 401. Then, results calculated by each of the multipliers in the multiplier set 401 are inputted in parallel into the four multipliers exclusively used by the processing element 400 and four multipliers exclusively used by the other processing elements. The four multipliers exclusively used by the processing element 400 and subsequent adders continue to calculate uncalculated portions in the equation, to obtain the channel values of corresponding channels in the target pixel. Other processing elements re-input the results calculated by respective processing elements into subsequent portions of the respective processing elements, and input in parallel the channel values of the corresponding channels into the respective processing elements, to execute subsequent calculation of the equation. Other processing elements calculate the channel values corresponding to the four pixels respectively in the same way as the processing element 400, and obtain the corresponding channel values in the target pixel, which are not repeated any more here. In this implementation, for respective processing elements, the calculations of $w_0 \times h_0$, $w_1 \times h_0$, $w_0 \times h_1$, and $w_1 \times h_1$ are identical operations. Therefore, the operations may be executed through a shared multiplier set, to avoid repeatedly executing the operations by the processing elements, thus reducing the number of components arranged in the array processor.

In some optional implementations of this embodiment, the processor 300 further includes a cache management circuit (not shown). The cache management circuit is configured for at least one of following items: releasing pixel data having an abscissa less than $x_0$ in each row in the first on-chip cache 304; or releasing pixel data having an abscissa equal to $x_0$ and an ordinate less than $y_0$ in each column in the second on-chip cache 305. In this implementation, the operations on the pixels in the scaling operation are executed orderly, pixels in the original image corresponding to the currently calculated target pixel are $(x_0,y_0)$, $(x_0+1,y_0)$, $(x_0,y_0+1)$, and $(x_0+1,y_0+1)$, suggesting that among the rows of the data in the first on-chip cache 304, the rows having an abscissa less than $x_0$ will not be used in subsequent processes. Therefore, the pixel data in the rows in the first on-chip cache 304 may be released, to enable the space generated after the release to be used for subsequently reading the pixel data. Likewise, the pixel data corresponding to columns having an abscissa less than $x_0$ and an ordinate less than $y_0$ in the second on-chip cache 305 may also be released. The data will not be used in subsequent processes, and may also be released in time to release a space for reading subsequent data.

In some optional implementations of this embodiment, the read operation control circuit 3031 is further configured for: determining rows to be read into the first on-chip cache 304 in the pixel data of the original image based on the abscissas of the pixels in the original image corresponding to target pixels in the target image; and reading the determined to-be-read rows row by row into the first on-chip cache 304. The read operation control circuit 3031 may be further configured for: determining columns to be read into the second on-chip cache 305 in each row of the pixel data in the first on-chip cache 304 based on ordinates of the pixels corresponding to target pixels in the target image in the original image; and reading the determined to-be-read columns column by column into the second on-chip cache 305. In this implementation, the read operation control circuit may only read data of the pixel corresponding to the target pixel in the original image row by row and column by column. Some pixels in the original image will not be used in case of a large image scaling factor. This implementation may reduce the time consumed during reading the pixels that are not involved in the calculation, thus further contributing to improving the overall execution speed.

When scaling an image, the processor provided by the above embodiments of the present disclosure calculates in parallel channel values of respective channels of a pixel in a target image using processing elements in the array processor, thereby improving the parallelism of image scaling, and greatly reducing the execution speed of an image scaling operation.

Figure 5:
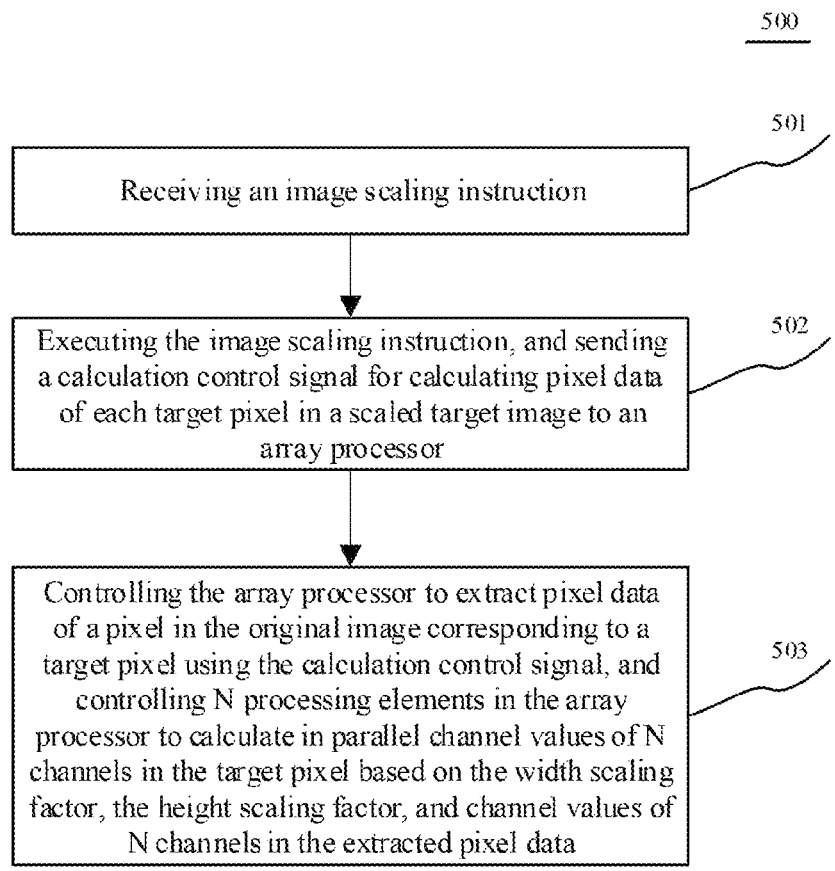
FIG. 5 is a flow chart of another embodiment of a method for scaling an image according to the present disclosure.

Please further refer to FIG. 5, which shows a flow 500 of an embodiment of a method for scaling an image. The process 500 of the method for scaling an image includes:

step 501: receiving an image scaling instruction.

In this embodiment, the processor (e.g., the special-purpose processor shown in FIG. 1) in which the method for scaling an image runs may receive an image scaling instruction from the outside (e.g., the general-purpose processor shown in FIG. 1) through a bus. The image scaling instruction may include a width scaling factor and a height scaling factor. The to-be-scaled original image may be an N-channel image (N is an integer greater than 1). The scaled image may be stored within the processor, or acquired from external.

step 502: executing the image scaling instruction, and sending a calculation control signal for calculating pixel data of each target pixel in a scaled target image to an array processor.

In this embodiment, the processor (e.g., the special-purpose processor in FIG. 1) may execute the image scaling instruction, and sending a calculation control signal for calculating pixel data of each target pixel in a scaled target image to an array processor. Usually, a size of the target image may be determined based on the size of the original image, and the width scaling factor and the height scaling factor in the image scaling instruction, and then the target pixel having to-be-calculated pixel data in the target image may be determined. For the target pixel, the processor may send the calculation control signal for calculating the pixel data of the target pixel in the scaled target image to the array processor, to enable the array processor to execute subsequent calculation operations.

For the target pixel in the target image, the processor may extract the pixel data of a pixel corresponding to the target pixel in the original image using the array processor. The pixel corresponding to the target pixel may be determined based on the scaling algorithm configured for the image scaling operation. For example, when an equation $Y(x,y)=X(x_0,y_0) \times w_0 \times h_0+X(x_0+1,y_0) \times w_1 \times h_0+X(x_0,y_0+1) \times w_0 \times h_1+X(x_0+1,y_0+1) \times w_1 \times h_1$ is configured as the scaling algorithm, the pixels corresponding to the target pixel are four adjacent pixels corresponding to coordinates $(x_0,y_0)$, $(x_0+1,y_0)$, $(x_0,y_0+1)$, and $(x_0+1,y_0+1)$ in the original image.

step 503: controlling the array processor to extract pixel data of a pixel in the original image corresponding to a target pixel using the calculation control signal, and controlling N processing elements in the array processor to calculate in parallel channel values of N channels in the target pixel based on the width scaling factor, the height scaling factor, and channel values of N channels in the extracted pixel data.

In this embodiment, based on the calculation control signal sent to the array processor in the step 402, the processor may control the array processor to calculate the pixel data of the target pixel in the scaled target image based on the control signal. Under the control of the control signal, the array processor may execute following operations: first, extracting the pixel data of the pixel in the original image corresponding to the target pixel into the array processor. Because the original image is an N-channel image, the pixel data of the pixels include channel values of each of the N channels. Then the array processor may calculate in parallel the channel values of the N channels in the target pixel using the N processing elements based on the channel values of corresponding channels in the extracted pixel data, thereby achieving processing of the plurality of channels in parallel.

In some optional implementations of this embodiment, the method further includes: reading the pixel data in the original image orderly into an on-chip cache; and the sending a calculation control signal for calculating pixel data of each target pixel in a scaled target image to an array processor including: sending to the array processor a calculation control signal of extracting the pixel data of the pixel in the original image corresponding to the target pixel from the on-chip cache. The corresponding implementation in the embodiment corresponding to FIG. 2 may be referred to for specific processing of the implementation, which is not repeated any more here.

In some optional implementations of this embodiment, the on-chip cache includes a first on-chip cache and a second on-chip cache, and a read-write speed of the second on-chip cache is greater than a read-write speed of the first on-chip cache; and the reading the pixel data in the original image orderly into an on-chip cache includes: reading the pixel data in the original image successively row by row into the first on-chip cache; and reading the pixel data in each row in the first on-chip cache successively column by column into the second on-chip cache; and the sending to the array processor a calculation control signal of extracting the pixel data of the pixel in the original image corresponding to the target pixel from the on-chip cache includes: sending to the array processor the calculation control signal of the pixel data of the pixel in the original image corresponding to the target pixel extracted from the second on-chip cache. The embodiment corresponding to FIG. 3 may be referred to for specific processing of the implementation, which is not repeated any more here.

In some optional implementations of the embodiment, the sending the calculation control signal of the pixel data of the pixel in the original image corresponding to the target pixel extracted from the second on-chip cache to the array processor includes: sending the calculation control signal to the array processor when completing reading the pixel data of the pixel in the original image corresponding to the target pixel into the second on-chip cache. The corresponding implementation in the embodiment corresponding to FIG. 3 may be referred to for specific processing of the implementation, which is not repeated any more here.

In some optional implementations of the embodiment, the method further includes: acquiring values of parameters $x_0$, $w_0$, $w_1$, $y_0$, $h_0$, and $h_1$ using coordinates $(x,y)$ of the target pixel in the target image, the width scaling factor scale_w, and the height scaling factor scale_h, and transferring the values to the array processor, where $x_0=\lfloor x/\text{scale\_w} \rfloor$, $y_0=\lfloor y/\text{scale\_h} \rfloor$, $h_0=y/\text{scale\_h}-y_0$, $h_1=y_0-y/\text{scale\_h}+1$, $w_0=x/\text{scale\_w}-x_0$, and $w_1=x_0-x/\text{scale\_w}+1$. The controlling the array processor to extract pixel data of a pixel in the original image corresponding to a target pixel, and controlling N processing elements in the array processor to calculate in parallel channel values of N channels in the target pixel based on the width scaling factor, the height scaling factor, and channel values of N channels in the extracted pixel data in the step 403 specifically includes: controlling the array processor to define four adjacent pixels corresponding to coordinates $(x_0,y_0)$, $(x_0+1,y_0)$, $(x_0,y_0+1)$, and $(x_0+1,y_0+1)$ in the original image as the pixels corresponding to the target pixel, and extract the pixel data; and controlling the N processing elements in the array processor to calculate in parallel the channel values $Y(x,y)$ of the N channels in the target pixel based on an equation $Y(x,y)=X(x_0,y_0) \times w_0 \times h_0+X(x_0+1,y_0) \times w_1 \times h_0+X(x_0,y_0+1) \times w_0 \times h_1+X(x_0+1,y_0+1) \times w_1 \times h_1$. The $X(x_0,y_0)$, $X(x_0+1,y_0)$, $X(x_0,y_0+1)$, and $X(x_0+1,y_0+1)$ are channel values of current channels in the four adjacent pixels respectively. The corresponding implementation in the embodiment corresponding to FIG. 3 may be referred to for specific processing of the implementation, which is not repeated any more here.

In some optional implementations of the embodiment, the acquiring values of parameters $x_0$, $w_0$, $w_1$, $y_0$, $h_0$, and $h_1$ using coordinates $(x,y)$ of the target pixel in the target image, the width scaling factor scale_w, and the height scaling factor scale_h further includes: determining a corresponding data table in a data table set pre-stored in the processor based on the width scaling factor scale_w and the height scaling factor scale_h; and querying current values of x and y in the determined data table to obtain corresponding values of the parameters $x_0$, $w_0$, $w_1$, $y_0$, $h_0$, and $h_1$. The data table set includes data tables corresponding to different values of the width scaling factor and the height scaling factor, and different values of x and y under a width scaling factor and a current height scaling factor, and values of $x_0$, $w_0$, $w_1$, $y_0$, $h_0$, and $h_1$ corresponding thereto are stored in the data tables in association. The corresponding implementation in the embodiment corresponding to FIG. 3 may be referred to for specific processing of the implementation, which is not repeated any more here.

In some optional implementations of the embodiment, the plurality of processing elements in the array processor shares a multiplier set. The N processing elements in the array processor calculating in parallel the channel values $Y(x,y)$ of the N channels in the target pixel based on an equation $Y(x,y)=X(x_0,y_0) \times w_0 \times h_0+X(x_0+1,y_0) \times w_1 \times h_0+X(x_0,y_0+1) \times w_0 \times h_1+X(x_0+1, y_0+1) \times w_1 \times h$, where the $X(x_0,y_0)$, $X(x_0+1,y_0)$, $X(x_0,y_0+1)$, and $X(x_0+1,y_0+1)$ are the channel values of current channels in the four adjacent pixels respectively, includes: calculating $w_0 \times h_0$, $w_1 \times h_0$, $w_0 \times h_1$, and $w_1 \times h_1$ using the multiplier set shared between the plurality of processing elements. The corresponding implementation in the embodiment corresponding to FIG. 3 may be referred to for specific processing of the implementation, which is not repeated any more here.

In some optional implementations of the embodiment, the method further includes at least one of following items: releasing pixel data having an abscissa less than $x_0$ in the rows in the first on-chip cache; or releasing pixel data having an abscissa equal to $x_0$ and an ordinate less than $y_0$ in columns in the second on-chip cache. The corresponding implementation in the embodiment corresponding to FIG. 3 may be referred to for specific processing of the implementation, which is not repeated any more here.

In some optional implementations of the embodiment, the reading the pixel data in each row in the first on-chip cache successively column by column into the second on-chip cache includes: determining rows to be read into the first on-chip cache in the pixel data of the original image based on abscissas of pixels in the original image corresponding to target pixels in the target image; and reading the determined to-be-read rows row by row into the first on-chip cache. And/or, the reading the pixel data in each row in the first on-chip cache successively column by column into the second on-chip cache includes: determining columns to be read into the second on-chip cache in the rows of the pixel data in the first on-chip cache based on ordinates of the pixels in the original image corresponding to each target pixel in the target image; and reading the determined to-be-read columns column by column into the second on-chip cache. The corresponding implementation in the embodiment corresponding to FIG. 3 may be referred to for specific processing of the implementation, which is not repeated any more here.

It should be noted that, the flow charts and block diagrams in the accompanying drawings illustrate architectures, functions and operations that may be implemented according to the systems, methods and computer program products of the various embodiments of the present disclosure. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved.

In another aspect, the present disclosure further provides a non-volatile storage medium. The non-volatile storage medium may be the non-volatile computer storage medium included in the apparatus in the above described embodiments, or a stand-alone non-volatile storage medium not assembled into the apparatus. The non-volatile storage medium stores one or more programs. The one or more programs, when executed by a device, cause the device to: receive an image scaling instruction, the image scaling instruction including a width scaling factor and a height scaling factor, a to-be-scaled original image being an N-channel image, N being an integer greater than 1; execute the image scaling instruction, and sending a calculation control signal for calculating pixel data of each target pixel in a scaled target image to an array processor; and control the array processor to extract pixel data of a pixel in the original image corresponding to a target pixel using the calculation control signal, and controlling N processing elements in the array processor to calculate in parallel channel values of N channels in the target pixel based on the width scaling factor, the height scaling factor, and channel values of N channels in the extracted pixel data.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A processor for scaling an image, comprising an off-chip memory, a communication circuit, a control circuit, and an array processor, wherein:
the off-chip memory is configured for storing a to-be-scaled original image, the original image is an N-channel image, and N is an integer greater than 1;
the communication circuit is configured for receiving an image scaling instruction, the image scaling instruction includes a width scaling factor and a height scaling factor;
the control circuit is configured for executing the image scaling instruction, and sending a calculation control signal for calculating pixel data of each target pixel in a scaled target image to the array processor; and
the array processor is configured for extracting pixel data of a pixel in the original image corresponding to a target pixel under the control of the calculation control signal, and calculating in parallel channel values of N channels in the target pixel using N processing elements in the array processor based on the width scaling factor, the height scaling factor, and channel values of N channels in the extracted pixel data,
wherein the processor further comprises:
a parameter transfer circuit, configured for acquiring values of parameters $x_0$, $w_0$, $w_1$, $y_0$, $h_0$, and $h_1$ using coordinates (x,y) of the target pixel in the target image, the width scaling factor scale_w, and the height scaling factor scale_h, and transferring the values to the array processor, wherein $x_0 = \lfloor x/\text{scale\_w} \rfloor$, $y_0 = \lfloor y/\text{scale\_h} \rfloor$, $h_0 = y/\text{scale\_h} - y_0$, $h_1 = y_0 - y/\text{scale\_h} + 1$, $w_0 = x/\text{scale\_w} - x_0$, and $w_1 = x_0 - x/\text{scale\_w} + 1$; and
the array processor is further configured for:
defining four adjacent pixels corresponding to coordinates $(x_0, y_0)$, $(x_0+1, y_0)$, $(x_0, y_0+1)$, and $(x_0+1, y_0+1)$ in the original image as the pixels corresponding to the target pixel, and extracting the pixel data; and
calculating in parallel the channel values Y(x,y) of the N channels in the target pixel using the N processing elements in the array processor based on an equation $Y(x,y) = X(x_0,y_0) \times w_0 \times h_0 + X(x_0+1,y_0) \times w_1 \times h_0 + X(x_0, y_0+1) \times w_0 \times h_1 + X(x_0+1, y_0+1) \times w_1 \times h_1$, wherein $X(x_0, y_0)$, $X(x_0+1, y_0)$, $X(x_0, y_0+1)$, and $X(x_0+1, y_0+1)$ are channel values of current channels in the four adjacent pixels respectively.

2. The processor according to claim 1, further comprising an on-chip cache; and
the control circuit comprising:
a read control unit configured for orderly reading the pixel data of the original image in the off-chip memory into the on-chip cache; and
a calculation control unit configured for sending to the array processor a calculation control signal of extracting the pixel data of the pixel in the original image corresponding to the target pixel from the on-chip cache.

3. The processor according to claim 2, wherein the on-chip cache comprises a first on-chip cache and a second on-chip cache, and a read-write speed of the second on-chip cache is greater than a read-write speed of the first on-chip cache; and the read control unit is further configured for:
reading the pixel data in the original image successively row by row into the first on-chip cache; and
reading the pixel data in each row in the first on-chip cache successively column by column into the second on-chip cache; and
the calculation control unit is further configured for:
sending to the array processor the calculation control signal of extracting the pixel data of the pixel in the original image corresponding to the target pixel from the second on-chip cache.

4. The processor according to claim 3, wherein the calculation control unit is further configured for:
sending the calculation control signal to the array processor when the read control unit completes reading the pixel data of the pixel in the original image corresponding to the target pixel into the second on-chip cache.

5. The processor according to claim 1, wherein the parameter transfer circuit is further configured for:
determining a corresponding data table in a data table set pre-stored in the processor based on the width scaling factor scale_w and the height scaling factor scale_h; and
querying current values of x and y in the determined data table to obtain corresponding values of the parameters $x_0$, $w_0$, $w_1$, $y_0$, $h_0$, and $h_1$;
wherein the data table set includes data tables corresponding to different values of the width scaling factor and the height scaling factor, and different values of x and y under a current width scaling factor and a current height scaling factor, and values of $x_0$, $w_0$, $w_1$, $y_0$, $h_0$, and $h_1$ corresponding thereto are stored in the data tables in association.

6. The processor according to claim 1, wherein the N processing elements in the array processor share a multiplier set, and
the array processor is further configured for:
calculating $w_0 \times h_0$, $w_0 \times h_0$, $w_0 \times h_1$, and $w_1 \times h_1$ using the multiplier set shared between the plurality of processing elements.

7. The processor according to claim 1, further comprising a cache management circuit configured for at least one of following items:
releasing pixel data having an abscissa less than $x_0$ in rows in the first on-chip cache; or
releasing pixel data having an abscissa equal to $x_0$ and an ordinate less than $y_0$ in columns in the second on-chip cache.

8. The processor according to claim 1, wherein the read operation control circuit is further configured for:
determining rows to be read into the first on-chip cache in the pixel data of the original image based on abscissas of pixels in the original image corresponding to target pixels in the target image; and
reading the determined to-be-read rows row by row into the first on-chip cache;
and/or
determining columns to be read into the second on-chip cache in the rows of the pixel data in the first on-chip cache based on ordinates of the pixels in the original image corresponding to target pixels in the target image; and
reading the determined to-be-read columns column by column into the second on-chip cache.

9. A method for scaling an image, comprising:
receiving an image scaling instruction, the image scaling instruction including a width scaling factor and a height scaling factor, a to-be-scaled original image being an N-channel image, N being an integer greater than 1;
executing the image scaling instruction, and sending a calculation control signal for calculating pixel data of each target pixel in a scaled target image to an array processor; and
controlling the array processor to extract pixel data of a pixel in the original image corresponding to a target pixel using the calculation control signal, and controlling N processing elements in the array processor to calculate in parallel channel values of N channels in the target pixel based on the width scaling factor, the height scaling factor, and channel values of N channels in the extracted pixel data,
wherein the method further comprises:
acquiring values of parameters $x_0$, $w_0$, $w_1$, $y_0$, $h_0$, and $h_1$ using coordinates (x,y) of the target pixel in the target image, the width scaling factor scale_w, and the height scaling factor scale_h, and transferring the values to the array processor, wherein $x_0 = \lfloor x/\text{scale\_w} \rfloor$, $y_0 = \lfloor y/\text{scale\_h} \rfloor$, $h_0 = y/\text{scale\_h} - y_0$, $h_1 = y_0 - y/\text{scale\_h} + 1$, $w_0 = x/\text{scale\_w} - x_0$, and $w_1 = x_0 - x/\text{scale\_w} + 1$; and
the controlling the array processor to extract pixel data of a pixel in the original image corresponding to a target pixel, and controlling N processing elements in the array processor to calculate in parallel channel values of N channels in the target pixel based on the width scaling factor, the height scaling factor, and channel values of N channels in the extracted pixel data comprising:
controlling the array processor to define four adjacent pixels corresponding to coordinates $(x_0,y_0)$, $(x_0+1,y_0)$, $(x_0,y_0+1)$, and $(x_0+1,y_0+1)$ in the original image as the pixels corresponding to the target pixel, and extract the pixel data; and
controlling the N processing elements in the array processor to calculate in parallel the channel values Y(x,y) of the N channels in the target pixel based on an equation $Y(x,y) = X(x_0,y_0) \times w_0 \times h_0 + X(x_0+1,y_0) \times w_1 \times h_0 + X(x_0,y_0+1) \times w_0 \times h_1 + X(x_0+1,y_0+1) \times w_1 \times h_1$, wherein $X(x_0,y_0)$, $X(x_0+1,y_0)$, $X(x_0,y_0+1)$, and $X(x_0+1,y_0+1)$ are channel values of current channels in the four adjacent pixels respectively.

10. The method according to claim 9, further comprising:
reading the pixel data in the original image orderly into an on-chip cache; and
the sending a calculation control signal for calculating pixel data of each target pixel in a scaled target image to an array processor comprising:
sending to the array processor a calculation control signal of extracting the pixel data of the pixel in the original image corresponding to the target pixel from the on-chip cache.

11. The method according to claim 10, wherein the on-chip cache comprises a first on-chip cache and a second on-chip cache, and a read-write speed of the second on-chip cache is greater than a read-write speed of the first on-chip cache; and the reading the pixel data in the original image orderly into an on-chip cache comprises:

reading the pixel data in the original image successively row by row into the first on-chip cache; and reading the pixel data in each row in the first on-chip cache successively column by column into the second on-chip cache; and the sending to the array processor a calculation control signal of extracting the pixel data of the pixel in the original image corresponding to the target pixel from the on-chip cache comprises:

sending to the array processor the calculation control signal of extracting the pixel data of the pixel in the original image corresponding to the target pixel from the second on-chip cache.

12. The method according to claim 11, wherein the sending to the array processor a calculation control signal of extracting the pixel data of the pixel in the original image corresponding to the target pixel from the second on-chip cache comprises:

sending the calculation control signal to the array processor when completing reading the pixel data of the pixel in the original image corresponding to the target pixel into the second on-chip cache.

13. The method according to claim 9, wherein the acquiring values of parameters $x_0$, $w_0$, $w_1$, $y_0$, $h_0$, and $h_1$ using coordinates (x,y) of the target pixel in the target image, the width scaling factor scale_w, and the height scaling factor scale_h comprises:

determining a corresponding data table in a data table set pre-stored in the processor based on the width scaling factor scale_w and the height scaling factor scale_h; and querying current values of x and y in the determined data table to obtain corresponding values of the parameters $x_0$, $w_0$, $w_1$, $y_0$, $h_0$, and $h_1$;

wherein the data table set includes data tables corresponding to different values of the width scaling factor and the height scaling factor, and the different values of x and y under a current width scaling factor and a current height scaling factor, and values of $x_0$, $w_0$, $w_1$, $y_0$, $h_0$, and $h_1$ corresponding thereto are stored in the data tables in association.

14. The method according to claim 9, wherein the N processing elements in the array processor share a multiplier set; and the controlling the N processing elements in the array processor to calculate in parallel the channel values Y(x,y) of the N channels in the target pixel based on an equation $Y(x,y)=X(x_0,y_0) \times w_0 \times h_0 + X(x_0+1,y_0) \times w_1 \times h_0 + X(x_0,y_0+1) \times w_0 \times h_1 + X(x_0+1,y_0+1) \times w_1 \times h_1$ comprises:

calculating $w_0 \times h_0$, $w_0 \times h_0$, $w_0 \times h_1$, and $w_1 \times h_1$ using the multiplier set shared between the plurality of processing elements.

15. The method according to claim 9, further comprising at least one of following items:

releasing pixel data having an abscissa less than $x_0$ in rows in the first on-chip cache; or releasing pixel data having an abscissa equal to $x_0$ and an ordinate less than $y_0$ in columns in the second on-chip cache.

16. The method according to claim 9, wherein the reading the pixel data in each row in the first on-chip cache successively column by column into the second on-chip cache comprises:

determining rows to be read into the first on-chip cache in the pixel data of the original image based on abscissas of pixels in the original image corresponding to target pixels in the target image; and reading the determined to-be-read rows row by row into the first on-chip cache;

and/or the reading the pixel data in each row in the first on-chip cache successively column by column into the second on-chip cache comprises:

determining columns to be read into the second on-chip cache in the rows of the pixel data in the first on-chip cache based on ordinates of the pixels in the original image corresponding to target pixels in the target image; and reading the determined to-be-read columns column by column into the second on-chip cache.

17. A device, comprising:

a processor; and a memory, the memory storing computer readable instructions executable by the processor, the processor executing operations for scaling an image when the computer readable instructions are executed, the operations comprising:

receiving an image scaling instruction, the image scaling instruction including a width scaling factor and a height scaling factor, a to-be-scaled original image being an N-channel image, N being an integer greater than 1;

executing the image scaling instruction, and sending a calculation control signal for calculating pixel data of each target pixel in a scaled target image to an array processor; and controlling the array processor to extract pixel data of a pixel in the original image corresponding to a target pixel using the calculation control signal, and controlling N processing elements in the array processor to calculate in parallel channel values of N channels in the target pixel based on the width scaling factor, the height scaling factor, and channel values of N channels in the extracted pixel data, wherein the operations further comprise:

acquiring values of parameters $x_0$, $w_0$, $w_1$, $y_0$, $h_0$, and $h_1$ using coordinates (x,y) of the target pixel in the target image, the width scaling factor scale_w, and the height scaling factor scale_h, and transferring the values to the array processor, wherein $x_0=\lfloor x/\text{scale\_w} \rfloor$, $y_0=\lfloor y/\text{scale\_h} \rfloor$, $h_0=y/\text{scale\_h}-y_0$, $h_1=y_0-y/\text{scale\_h}+1$, $w_0=x/\text{scale\_w}-x_0$, and $w_1=x_0-x/\text{scale\_w}+1$; and the controlling the array processor to extract pixel data of a pixel in the original image corresponding to a target pixel, and controlling N processing elements in the array processor to calculate in parallel channel values of N channels in the target pixel based on the width scaling factor, the height scaling factor, and channel values of N channels in the extracted pixel data comprising:

controlling the array processor to define four adjacent pixels corresponding to coordinates $(x_0,y_0)$, $(x_0+1,y_0)$, $(x_0,y_0+1)$, and $(x_0+1,y_0+1)$ in the original image as the pixels corresponding to the target pixel, and extract the pixel data; and controlling the N processing elements in the array processor to calculate in parallel the channel values Y(x,y) of the N channels in the target pixel based on an equation $Y(x,y)=X(x_0,y_0) \times w_0 \times h_0 + X(x_0+1,y_0) \times w_1 \times h_0 + X(x_0,y_0+1) \times w_0 \times h_1 + X(x_0+1,y_0+1) \times w_1 \times h_1$, wherein $X(x_0,y_0)$, $X(x_0+1,y_0)$, $X(x_0,y_0+1)$, and $X(x_0+1,y_0+1)$ are channel values of current channels in the four adjacent pixels respectively.

18. A non-volatile computer storage medium, the computer storage medium storing computer readable instructions thereon, the computer readable instructions, when executed by a processor, cause the processor to perform the method according to claim 9.

\* \* \* \* \*

UNITED STATES PATENT AND TRADEMARK OFFICE
CERTIFICATE OF CORRECTION

PATENT NO. : 10,922,785 B2  
APPLICATION NO. : 16/265566  
DATED : February 16, 2021  
INVENTOR(S) : Yichen Tu et al.

Page 1 of 1

It is certified that error appears in the above-identified patent and that said Letters Patent is hereby corrected as shown below:

In the Claims

In Column 15, Line 46, Claim 6, delete "$w_0 \times h_0$," and insert --$w_1 \times h_0$,--.

In Column 17, Line 52, Claim 14, delete "$w_0 \times h_0$," and insert --$w_1 \times ssh_0$,--.

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*